United States Patent Office 3,016,303
Patented Jan. 9, 1962

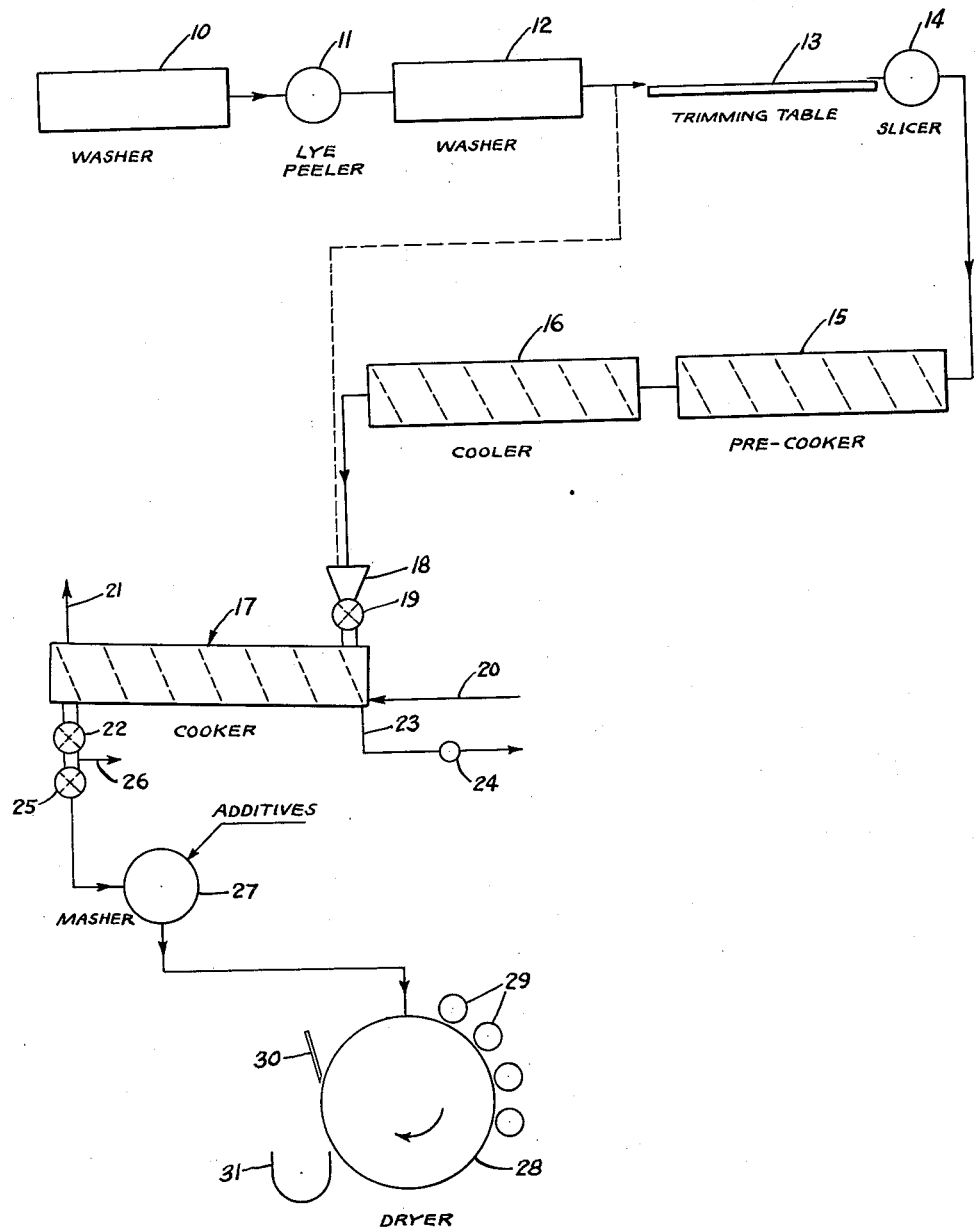

3,016,303
VEGETABLE DRYING PROCESS
Albert M. Cooley, Grand Forks, N. Dak., assignor to The State University and The School of Mines, also known as University of North Dakota, Grand Forks, N. Dak.
Filed July 15, 1960, Ser. No. 43,129
11 Claims. (Cl. 99—207)

This invention relates to the art of producing dehydrated mashed starchy vegetables, such as mashed potatoes. More particularly this invention relates to an improvement in the process of producing dehydrated mashed potatoes by drum drying. Specifically the present invention relates to a treatment step for the upgrading of low solids potatoes to raise their solids content to adapt and condition such potatoes for the production of high quality dehydrated cooked mashed potato flakes and flour.

There has been developed by the United States Department of Agriculture a method of producing dehydrated mashed potatoes in flaked form. This method consists in peeling and slicing the potatoes, cooking, mashing and drying on a heated drum. The product from the drum is in the form of a thin sheet which is broken into flakes and packaged. The product can be reconstituted to give mashed potatoes of good texture and flavor. The texture of the finished product is dependent to a large degree both upon the raw potato material used and upon processing conditions. It is known that the texture of some "waxy" type potatoes or non-mealy varieties can be changed by a gelatinization of the starch by rather low temperature cooking followed by cooking at temperatures of 212° F. This texture change makes possible the production of a mealy product from non-mealy potatoes and makes possible the production of a suitable product for use as mashed potatoes by means of flake driers.

This change of temperature, however, has not been effective for all types and solids contents of potatoes. It is known that the higher solids content potatoes are more amenable to production of a satisfactory dehydrated product. Satisfactory processing of low solids potatoes to an acceptable texture and flake density was not accomplished prior to the present invention.

The natural solids content of potatoes varies between about 16 and 24 percent. Solids content varies among varieties of potatoes, geographical areas where the potatoes are grown, growing conditions such as weather, soil, fertilizer used, and the like. Heretofore, the production of dehydrated potato flakes of satisfactory texture and flavor has been largely limited to the use of relatively high solids potatoes having about 20 percent solids or more. Paradoxically, those potatoes which produce the best dehydrated product are also in greatest demand for shipping. Those potatoes which are least adapted to dehydration are in least demand for shipping and therefore more readily available for processing in the areas in which they are grown.

The principal object of this invention is to provide a method of drying potatoes wherein low solids content potatoes are upgraded to produce a dehydrated product of satisfactory flavor and texture.

A further object of this invention is to provide a method of drying potatoes characterized by a cooking step wherein the potatoes are intermittently subjected to alternate steam and vacuum cycles to reduce the water content and raise the solids content.

Other objects of the invention will become apparent as the description proceeds.

To the accomplishment of the foregoing and related ends, this invention then comprises the features herein- after fully described and particularly pointed out in the claims, the following description setting forth in detail certain illustrative embodiments of the invention, these being indicative, however, of but a few of the various ways in which the principles of the invention may be employed.

The invention is illustrated by the single sheet of drawings which is a flow sheet showing in schematic form the processing equipment and operation.

The potatoes are initially passed through a washer 10 where they are subjected to a high pressure cold water spray to remove dirt, soil and the like from the skins of the potatoes. The washed potatoes are then passed to a lye peeler 11 in which they are subjected to the soaking action of a hot caustic solution for the purpose of loosening and removing the potato peel. Typical operating conditions in the peeler include a concentration between about 10 percent and 25 percent of sodium hydroxide in water maintained at a temperature between about 130° and 190° F. The potatoes are submerged in this solution for between about 1 and 12 minutes. Lesser soaking time is required at higher concentrations and higher temperatures and longer time is required when using weaker solutions at lower temperatures. Optionally the washed potatoes may be preheated to raise their temperature to about the temperature of the lye solution.

From the peeler 11 the potatoes pass through a further washer 12 where they are subjected to a high pressure spray of cold water to wash away traces of caustic, peel and the like. The peeled washed potatoes then pass to a trimming table 13 where the potatoes are visually inspected and eyes, bruised areas and the like are manually removed. From the trimming table the potatoes pass through a slicer 14 in which they are cut into ½ inch to ⅝ inch slices.

The potato slices are then subjected to a 20 to 30 minute precook in water maintained at between 140° and 180° F. The precooker 15 is desirably of the screw conveyor type in which the potato slices are progressed gradually from one end of the precooker tank to the other through the hot water. From the precooker the potato slices pass to a cooler 16, also desirably of the screw conveyor type. The potatoes are desirably cooled for about 20 minutes in water at about 50° F. but this may vary depending upon the available source of cooling water and its temperature.

The cooled potato slices are then passed to the cooker 17. The potato slices are fed to the hopper 18 which is provided which an air lock 19 of the paddle wheel type by which potatoes may be continuously introduced to the cooker while the tight fitting paddle edges maintain a sealed closure. The cooker 17 is also desirably of the screw conveyor type. It is connected to a steam supply line 20 and also to a vacuum line 21 for the intermittent application of steam pressure and vacuum. The exit end of the cooker is also provided with an air lock 22. The cooker is desirably tilted slightly with its entrance end lower than its exit to permit withdrawal of steam condensate through a line 23 by means of a suitable pump indicated at 24.

In the cooker the potatoes are subjected to steam cycles of from about 4 to 6 minutes' duration and then are subjected to vacuum for periods of about 2 to 4 minutes' duration, after which the steam and vacuum cycles are repeated in sequence several times; i.e., four to six times. Under preferred operating conditions the potatoes are subjected to five minutes steam cycles and 2 to 3 minute vacuum cycles and the potatoes are permitted to remain in the cooker to undergo a total of five steam and vacuum cycles. Cooking time varies somewhat depending upon the slice thickness but the potatoes should be subjected to a minimum of 20 minutes' cooking time.

Introduction of steam to the closed cooker results in a temperature between about 212° and 220° F. The length of the vacuum cycle depends somewhat on the efficiency of the vacuum pump. A vacuum between about 26 and 27 inches of mercury is relatively easily attainable and has been found to produce satisfactory results. During the vacuum cycle the temperature is reduced to about 125° F. The alternate steam and vacuum treatment results in an overall reduction of water content in the potatoes with a consequent increase in solids content. The greatest water loss is in the first vacuum cycle. The steam condenses on the potato in subsequent cycles in reheating the potato and apparently a considerable amount of water remains on the surface of the potato slices and re-enters the potato. The net water loss is still sufficient, however, to upgrade potatoes of low solids content so as to permit the production of high quality flakes at good production rates. The alternate steam and vacuum cycles may be automatically timed by means of commercially available timers.

The exit end of the cooker is provided with a double air lock. The second exit lock 25 is of the same type already described. The space between the locks 22 and 25 is connected to a vacuum source, as by line 26, to insure that the potatoes are under vacuum before being discharged from the cooker. The reason for this is that in continuous operation potatoes are being discharged from the cooker during the steam cycle and those potatoes would normally carry excess condensed moisture which is desirably removed before drying.

The cooked potatoes discharged from the cooker through locks 22 and 25 are then passed to a masher 27. This masher is desirably of the ricer type in which the cooked potato is forced through a perforated plate or through closely spaced rods. Ideally the starch cells are separated but not fractured and the mashed products should be free from lumps. Small amounts of additives such as antioxidants, preservatives and the like may also be added to the potatoes in the masher.

The mashed potato product is then introduced to the drier which includes a steam heated drum 28 having a plurality of applicator rolls 29 spaced from the drum surface along one side. The applicator rolls apply a thin layer of the mashed potato product to the surface of the drum. In the course of its slow rotation the heated surface of the drum dries the potatoes and they are scraped from the drum surface as a sheet or film by means of a scraper blade 30 or the like and permitted to drop into a hopper or conveyor and then subsequently broken, screened, weighed and packaged for shipment or storage. The dehydrated product is in flake form or may be reduced to flour. It is reconstituted by the addition of between about 4 and 5 parts of water and/or milk, plus flavoring such as butter, salt, pepper and the like.

The mashed potatoes are applied to the drier drum in a thin layer ranging between about 0.004 to 0.01 inch thickness. The applicator rolls are desirably spaced with a clearance of about 0.25 to 0.625 inch. When the dryer has four rolls the first two are desirably set with ⅜" clearance, the next with 5/16" clearance and the last with ¼" clearance. The rolls are set closer for a mash which is dry and which has a tendency to fall from the rolls. The rolls are rotated at such a rate that the potatoes are reduced to a desired moisture content between about 4 percent to 10 percent in about 10 to 20 seconds.

Although described with particular reference to the production of dehydrated potato flakes it is equally applicable to the production of potato flour and other mashed, dehydrated vegetables such as rutabagas, squash and the like. Under some circumstances the washed, peeled potatoes may be passed directly to the cooker without trimming, slicing, precooking and cooling, as indicated by the broken line path between washer 12 and cooker 17. This may be true, for example, in the manufacture of potato flour. Heretofore, processors of potato flour have suffered along with low output and thin, fragile flakes when they have had to process too low solids potatoes.

The process of this invention makes it possible to produce a dehydrated potato product of good flavor and texture from low solids content potatoes having between about 16½ to 18½ percent solids which are comparable in quality to the product formerly attainable only with high solids content potatoes having 21 percent or more solids. Although adapted primarily to the processing of low solids content potatoes it will be understood that in large scale processing the solids contents of potatoes from a particular geographical area may vary widely from lot to lot depending upon variety, local growing conditions and the like. Although not necessary to the production of quality flakes from high solids content potatoes the process of the present invention is advantageous in the processing of potatoes having higher solids content and greater drying efficiency and a higher quality product is achieved. Thus, ordinarily poor potatoes can be made to produce good quality flaked potatoes and good potatoes are made to produce even better quality flakes. The process is of particular interest in those growing areas where the varieties best adapted to conditions prevalent in those areas are of the low solids type.

A small amount of sulfur dioxide is desirably added as a preservative to the potato mash before drying. Sulfur dioxide is conveniently added from a sulfite compound such as sodium sulfite or sodium bisulfite. An antioxidant is desirably incorporated to inhibit the formation of rancid products from the small amount of fat which occurs in potatoes. Exemplary materials are butylated hydroxytoluene and butylated hydroxy anisole in a vegetable oil carrier available under the trademark "Tenox." This material is added at the rate of about 0.08 gram per pound of wet mash. Glycerol monopalmitate improves the texture of the mashed potatoes and especially the tolerance of the product to boiling water in reconstitution. Glycerol monopalmitate may be added up to a maximum of about 2 percent by weight of the dry flake and desirably in the range between about 0.25 percent to 0.5 percent of the weight of flake.

The invention is further illustrated by the following examples:

*Example 1*

A batch of Kennebec variety of potatoes was processed. This is a medium solids content potato grown in the Red River Valley of Minnesota and North Dakota. The potatoes processed has a solids content of 20.2 percent and contained 79.8 percent water. The potatoes were washed and peeled by submersion for 3 minutes in a 20 percent solution of sodium hydroxide maintained at 180° F. The peeled potatoes were washed, trimmed and cut into half inch slices. The slices were precooked in water for 20 minutes at 160° F. and then cooled in water for 20 minutes at 50° F. The precooked and cooled potato slices were then subjected to five alternating cycles of steam at 220° F. for 5 minutes each followed by 26 inches of vacuum for 2 minutes. Each steam cycle was followed by a vacuum cycle.

The potato weight upon introduction to the cooker was 57.4 pounds and at the end of the first vacuum cycle this batch weighed 51.9 pounds for a weight of 5.5 pounds of water. The water loss is greatest during the first vacuum cycle. In each of the following four cycles the water loss varied between 1.2 and 1.4 pounds. After the fifth cycle the final weight of the batch was 46.8 for a total water loss of 10.6 pounds. This represented a weight loss of 18.4 percent with the result that the solids content of the potatoes was upgraded to 23.6 percent. The product was mashed and dried to produce a flake of good flavor and texture. The result of the alternating steam pressure and vacuum in the cooking step upgraded the potato from one of only medium solids content to one of relatively high solids content. The upgrading of the raw material resulted in increased dryer capacity.

*Example 2*

A further batch of Kennebec variety potatoes were processed as described in Example 1, by washing, peeling, rewashing, trimming, slicing, precooking, cooling and then cooking in alternating steam pressure and vacuum cycles. The sliced potatoes were alternately subjected to steam at 220° F. for five minutes and then to 26 inches of vacuum for two minutes and this was repeated five times. A batch of initial weight of 49 pounds weighed 44.2 pounds at the end of the first cycle for a loss of weight due to removal of water of 4.8 pounds. In each of the following four cycles from 0.9 to 1.1 pounds of water were removed with the result that at the end of the fifth cycle the potato batch weighed forty pounds for a total loss of nine pounds of water. This equals an 18.4 percent reduction in water to raise the solids content of the potatoes from 20.2 to 23.6 percent. This cooked product likewise produced a dried flake of good quality.

*Example 3*

In still another processing test, potatoes of the Pontiac variety were treated. This is a common variety grown in the Red River Valley and has widely varying solids content. These potatoes which were of relatively low solids content were treated as described in Example 1. The result was an increase in solids content from 17.3 percent to 19.5 percent. This material produced a flake of reasonably good quality, normally impossible with a raw material of such relatively low solids content.

*Example 4*

A further batch of Kennebec variety potatoes having a solids content of 20.8 percent was processed as heretofore described. As a result of the cooking step according to the present invention the solids content was raised to 22.5 percent and a high qualtity flake resulted.

*Example 5*

A further batch of Pontiac variety potatoes grown under ideal conditions and having a solids content of 21 percent was processed as described in Example 1. The solids content of the potatoes after cooking was 25 percent and the potatoes produced a flake of excellent quality.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. A process for producing dehydrated mashed starchy vegetables comprising cooking raw vegetables for a period of at least 20 minutes by alternately subjecting to steam and vacuum a plurality of times, mashing the cooked vegetables, drying the mashed vegetables to a final moisture content of about 4 to 10 percent by applying a thin film of the mashed vegetables to a heated surface and then recovering the dried vegetables from said surface.

2. A process according to claim 1 further characterized in that said raw vegetables are peeled and sliced prior to cooking.

3. A process according to claim 2 further characterized in that said raw vegetables are precooked for from about 20 to 30 minutes at about 140° to 180° F. and then cooled prior to cooking.

4. A process according to claim 1 further characterized in that said raw vegetables are subjected to steam at between about 212° and 220° F. for about four to six minute cycles alternated with two to four minute cycles of vacuum.

5. A process according to claim 4 further characterized in that said vegetables are subjected to a vacuum between about 26 to 27 inches of mercury.

6. A process according to claim 5 further characterized in that said vegetables are subjected to four to six cycles of alternating steam and vacuum.

7. A process according to claim 1 further characterized in that said vegetable is potatoes.

8. A process for producing dehydrated mashed potatoes from normally low solids content potatoes comprising cooking raw low solids content potatoes by subjecting them alternately to steam at about 212° to 220° F. for a plurality of cycles of about four to six minutes' duration and then subjecting said potatoes to vacuum of about 26 to 27 inches of mercury for cycles of about two to four minutes' duration for a total of at least twenty minutes' cooking time, mashing the cooked potatoes, drying the mashed potatoes to a final moisture content of about 4 to 10 percent by applying a thin film of the mashed potatoes to a heated surface and then recovering the dried potatoes from said surface.

9. A process according to claim 8 further characterized in that said raw potatoes are cut into slices between about one-half and five-eighths inches in thickness, precooked for about 20 to 30 minutes at 140° to 180° F. and then cooled before cooking.

10. A process according to claim 8 further characterized in that said potatoes are subjected to between about four and six cycles of alternating steam and vacuum.

11. A process according to claim 10 further characterized in that said potatoes are subjected to a total of five cycles of steam exposure of about five minutes' duration alternated with subjection to vacuum for periods of about two to three minutes' duration.

References Cited in the file of this patent

UNITED STATES PATENTS 2,709,857    Rivoche _____ June 7, 1955

OTHER REFERENCES

Cording, Jr. et al.: Bulletin ARS 73–25, U.S. Dept. of Agriculture (July 1959), Potato Flakes, pp. 5–9.